United States Patent [19]

Fujimoto et al.

[11] Patent Number: 4,839,790
[45] Date of Patent: Jun. 13, 1989

[54] GAS ACCIDENT PREVENTIVE UNIT

[75] Inventors: Tatsuo Fujimoto, Yokohama; Tsutomu Ohya, Narashino, both of Japan

[73] Assignee: Tokyo Gas Co., Ltd., Japan

[21] Appl. No.: 105,395

[22] Filed: Oct. 5, 1987

[30] Foreign Application Priority Data

Jun. 17, 1985 [JP] Japan ............................... 60-131348
Jun. 17, 1985 [JP] Japan ............................... 60-131349

[51] Int. Cl.$^4$ ........................ G01F 1/00; G05B 13/02
[52] U.S. Cl. ................................... 364/184; 364/510; 364/143; 364/153; 73/861; 73/861.02; 73/861.03; 48/194; 48/DIG. 10
[58] Field of Search ............... 364/153, 143, 166, 148, 364/184, 565, 431.09, 569, 510; 48/DIG. 10, 194; 73/861.01, 861.02; 137/487.5

[56] References Cited

U.S. PATENT DOCUMENTS

| | | | |
|---|---|---|---|
| 4,308,866 | 1/1982 | Jelliffe et al. | 364/413 |
| 4,326,411 | 4/1982 | Gant et al. | 364/510 |
| 4,518,955 | 5/1985 | Meyer | 137/487.5 X |
| 4,562,552 | 12/1985 | Miyaoka et al. | 364/510 |
| 4,725,964 | 2/1988 | Lloyd et al. | 364/510 |

Primary Examiner—Michael R. Fleming
Assistant Examiner—P. Gordon
Attorney, Agent, or Firm—McGlew & Tuttle

[57] ABSTRACT

A gas accident preventive unit has a memory circuit which is capable of memorizing in advance a continuous service safety time according to a consumed gas volume of gas apparatuses that are installed at a gas user. The unit also includes a control circuit for sending out to an emergency shutoff valve, a close signal for cutting off the gas being supplied to the user in the event that any increase in gas flowrate is recognized in the previously measured value and the value measured this time by taking a measurement of the whole gas flowrate value being supplied to the gas user at a certain interval of time. The unit takes the measurement of continuous service hours on individual gas apparatuses or the gas apparatus having the largest gas consumption volume now under service, or responds to when the service of gas apparatus with the largest gas consumption volume being monitored has elapsed the continuous service safety time.

1 Claim, 5 Drawing Sheets

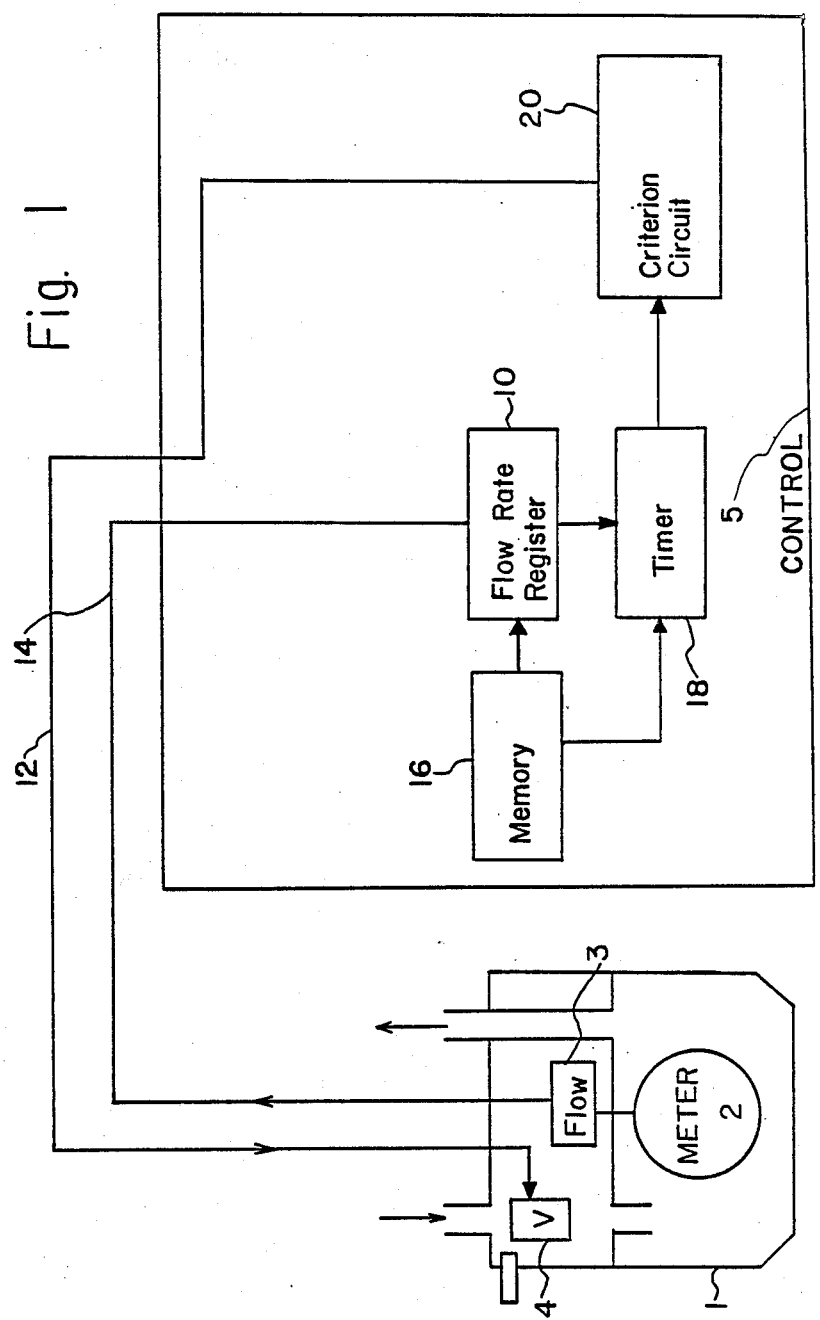

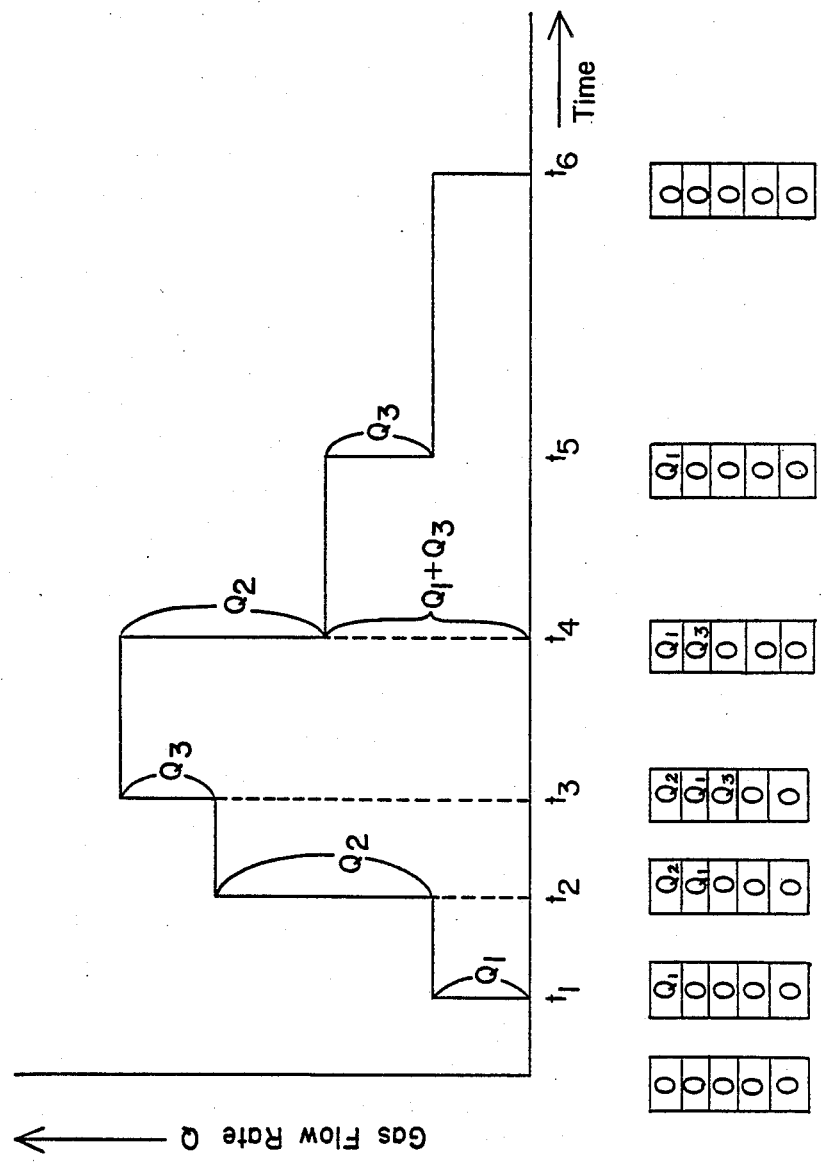

GAS ACCIDENT PREVENTIVE UNIT

FIELD AND BACKGROUND OF THE INVENTION

This invention is concerned with a gas accident preventive unit for preventing the occurrence of a fire, disaster, or an accident caused by gas. The type of incidence which this invention intends to prevent is one such as carbon monoxide intoxication from the leakage of gas supplied to a general household or an accident caused by the failure of putting out a gas apparatus.

DESCRIPTION OF THE PRIOR ART

Gas safety units are publicly known for stopping the flow of gas by functioning a gas burner, incomplete combustion unit, or an overheating preventive unit as to respective gas apparatuses that detect any abnormally high pressure in the gas being supplied to the general household. Also, gas safety units have been known to utilize overflow preventive valves which are activated when an abnormal flow of gas passes through a gas plug.

However, the aforesaid safety units, though being able to solve individual problems, cannot solve the safety problem in its total aspect. Moreover, there are many pipe and gas apparatuses in existing homes or buildings which lack the safety units as described above.

From this point of view, this inventor applied for a patent (Patent official report No. 57-19597) in Japan that functions to stop the flow, namely the supply of gas when a dangerous condition is noticed, by monitoring the service situation from the gas flow rate volume and the flowrate continuous time.

In that patent application the continuous service safety time of a single gas apparatus is memorized in advance and an increment is obtained when there is a recognized increase in the volume of gas being consumed by an apparatus. The detection of an increase in flow rate is made possible by taking a constant measurement of flow rate. Comparisons can then be made between the instant measurement and the previous one. The flow of gas or the supply of gas used in each instant is stored. From the continuous measurement, changes are recognized in the amount of gas supplied from one time to another. The memorized continued service safety time is then measured against the gas consumed by the maximum gas consumption apparatus in use. Assumptions are then made whether the apparatus is safe or not. For instance, if the apparatus being used is safe and being used in a normal way, a change is found in the entire flow rate of the gas supplied. Similarly, an assumption can be made that no one is home or that someone has failed to put out an apparatus if no change in flow rate is recognized for a certain period of time.

However, the aforesaid invention involves some problematic aspects as mentioned below.

Namely, if the gas is stopped under the aforementioned conditions, the danger is kept monitored always in respect to the service time of the apparatus with maximum gas consumption volume out of the gas apparatuses in use. It is not only extremely effective when viewed from safety aspects but, also, there is no anxiety caused by the shortage of gas used at an earlier time due to the fact that the service time of a single gas apparatus is monitored in relation to the whole the flow rate value.

However, some gas apparatus functions automatically keep the ON/OFF operation in order to maintain the hot water temperature to a constant level. For instance, as found in a hot water storing type hot water boiler, if this type of gas apparatus is considered, the measurement is to be cleared every time the ON/OFF operation is repeated. As a result, there is the possibility of not being able to detect a gas leakage or the failure of turning off a gas apparatus. FIG. 2 shows one of the aforesaid conventional examples. Suppose that the gas volume "Q1" has been measured, and the flow rate "Q2" is then measured after the lapse of a certain period of time since starting a timer. In this case even if there exists the relation of $Q2<Q1$ or $Q1</\backslash<Q1$ or $Q1<Q2$, the time is cleared since there is the change in flow rate, and the safety time is to be measured again from 0. As a result, the ON state for many hours will be overlooked by clearing the measurement. Thus, the situation of not being able to close the emergency shutoff valve may occur after the lapse of many hours. This may happen despite the fact that the gas apparatus equalling to Q1 is the apparatus having the maximum gas consumption volume, or that the said apparatus should be in the ON state for many hours in excess of the service safe time.

SUMMARY AND OBJECT OF THE INVENTION

It is an object of the invention to provide a gas accident preventive unit which is effective especially for gas apparatus having a control unit for repeating an automatic ON/OFF operation.

According to the invention, a gas accident preventive unit is provided for use with a plurality of gas consuming apparatuses, each gas consuming apparatus having a continuous service safety time and having a gas consumption volume per unit time which is used by that gas consuming apparatus. The gas accident preventive unit advantageously includes a flow rate measuring unit for measuring total flow rate per unit time of all gas consumed by all gas consuming apparatuses which are activated for consuming their respective gas consumption volumes. An emergency shutoff valve for shutting off the flow of all gas being supplied to all gas consuming apparatuses is provided. The emergency shutoff valve is responsive to a closed signal for closing the flow of gas. A control circuit is connected to the flow rate measuring unit for continuously receiving a flow rate signal or value corresponding to the flow of all gas to all activated gas consuming apparatuses. The control circuit generates a closed signal and is connected to the emergency shutoff valve for applying a control signal to the emergency shutoff valve to close the flow of all gas to all gas consuming apparatuses. The control circuit advantageously comprises a memory for storing the continuous service safety time for each gas consuming apparatus, a flowrate register for receiving the flow rate value from the flow rate measuring unit and for identifying increases in the flow rate value which corresponds to a gas consumption value of a newly activated gas consuming apparatus and for recognizing a decrease in the flow rate value corresponding to the gas consumption value of a newly deactivated gas consuming apparatus. The control circuit also includes a timer connected to the flow rate register for initiating a timing period upon the sensing by the flow rate register of a flow rate value corresponding to a gas consumption value of a gas consuming apparatus, the timer continuing in response to the flow rate register despite increases and decreases caused by the activation and deactivation of other gas consuming apparatuses. A criterion circuit is provided which is connected to the timer for generating the closed signal when the time has indicated a time greater than the continuous service safety time for the gas consuming apparatus which is sensed to be activated by the flow rate register for closing the emergency shutoff valve.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

FIG. 1 is a schematic view of this invention;

FIG. 2B is a view similar to FIG. 2A showing the operation theory of the present invention;

DETAILED DESCRIPTION OF PREFERRED EMBODIMENT

Figure 2A:
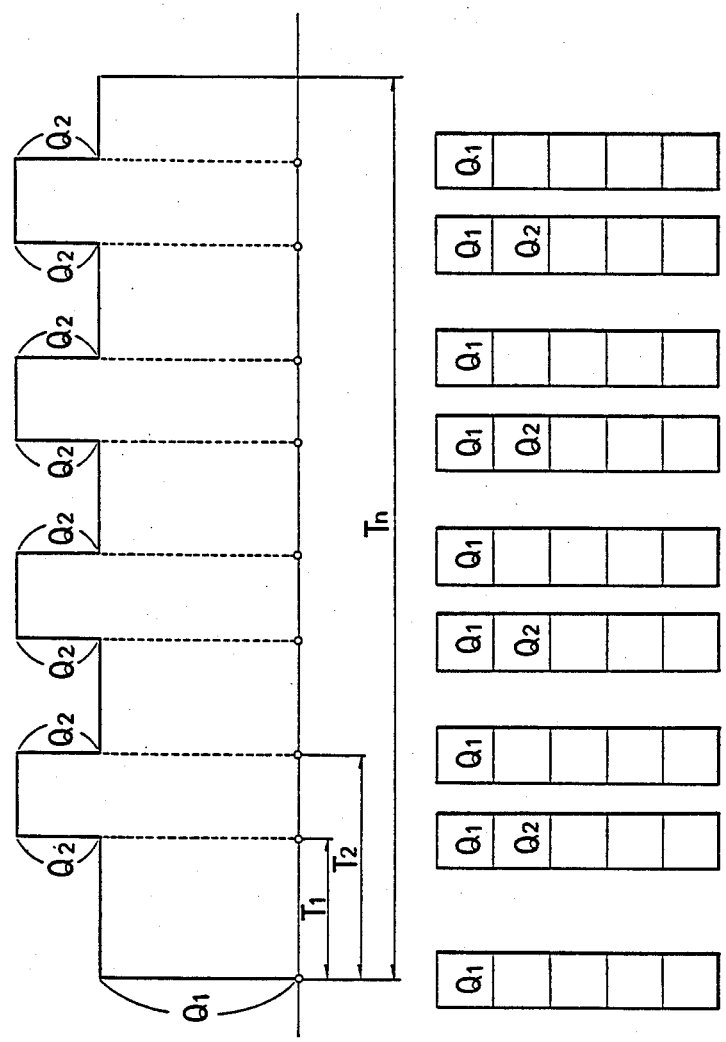
FIG. 2A is a view showing the operation theory of this invention.
Figure 3:
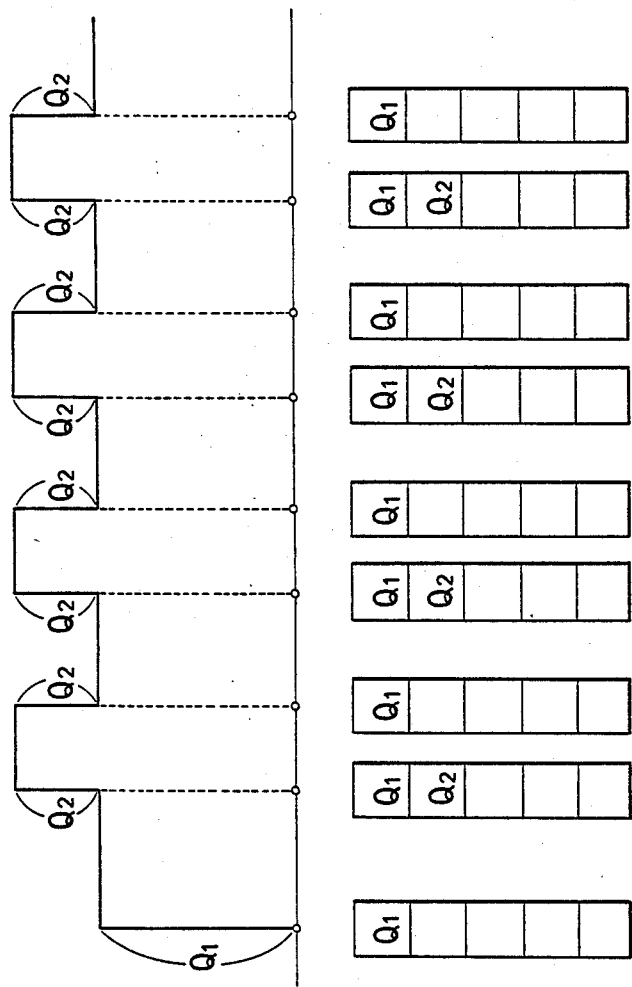
FIG. 3 is a view showing the operation principle of a publicly known gas accident preventive unit.

FIG. 1 shows an embodiment of this invention as described above, where 1 is a gas meter, 2 a metering section and 3 gas flow rate measuring unit for the gas flowing to the user side. The flow rate measuring unit 3 has a structure for emitting a digital signal of one pulse at every rotation of the gas meter. To this end unit 3 uses a permanent magnet connected to a part of a crank mechanism inside the diaphragm type gas meter 1 and has a magnet responsive element for generating the pulse by virtue of the magnetic force within the magnet sensitive range of the permanent magnet. Reference numeral 4 is an emergency shutoff valve that is fitted to the inside of the gas meter on a gas supply line. Reference number 5 represents a control circuit (control unit).

As to the gas apparatus being possessed and used by a user, the continuous service safety time of each single gas apparatus can be memorized in advance according to the consumed volume of gas. The measurement of continuous service safety time for the individual gas apparatuses is used to detect an abnormality and to emit a close or shut off signal to the aforesaid emergency shutoff valve 4 when the aforesaid corresponding continuous service safety time is exceeded for the first time. The assumption is that the apparatus which is newly started is the one whose consumption volume of gas is closest to the increase recognized in the gas flow rate value of the entire system. Similarly, the gas apparatus which is closest, in consumed volume to the decrease in the whole of the gas flow rate value, is recognized as the one being turned off.

The flow rate measuring unit includes a flowrate measuring circuit for taking the measured flow rate for the entire gas volume for periodic increments of time. This information in the form of a signal is fed to control means 5. The control means 5 preferably includes a flow rate register circuit for registering means 10. Register circuit 10 registers the increased portion of the consumption volume for the increased amount of flow rate of a single unit or gas consuming apparatus. The register circuit evaluates the incoming signal regarding an increase of flow rate as an apparatus which has newly been put into service. That is, the difference between the previous value and the value at a given time, of the flow rate signal, which has been measured by the gas flow rate measuring circuit, is considered an apparatus which has newly been put into service. When the newly perceived value (the value of the signal from the flow rate measuring circuit) is lower than the previous value, the registration circuit compares the difference or decrease to the consumption volume closest to the decreased portion. The information or signal of the value of the consumption volume or flow rate passes from the flow rate measuring unit 3 to the flow rate register 10 by means of a signal connection 14.

A memory circuit 16 is connected to the flow rate register 10. The memory circuit has stored, in advance, the continuous service safety time of a single unit of gas apparatus in accordance with the gas consumption volume. A timer circuit or timer means 18 counts the continuous safety time of gas consumption volume from the memory unit information corresponding to the flow rate. The time is calculated from when the flow rate value or flow rate signal is augmented corresponding to an apparatus being newly registered in the flow rate registering circuit. A criterion circuit 20 transmits a closed signal or shutoff signal over connection 12 to the emergency shutoff valve 4 when any one of the plurality of gas apparatuses has exceeded the continuous service safety time.

According to the novel arrangement of elements in the control unit, the control unit is used to memorize the continuous service safety time for each of the gas consuming apparatuses by means of the memory 16. The control unit timer means 18 is then activated when the control unit senses the consumption of gas which corresponds to a known gas consumption value for one of the apparatuses. This is done through the flowrate register 10. Flow rate register 10 ignores increases and decreases which corresponds to known consumption values of other gas consuming apparatuses. As long as one of the gas consuming apparatuses corresponds to the greatest consumer gas which is activated at any one time, it is sensed to be on by the flow rate register, and therefore the timer continues its count. When the lapsed time exceeds the continuous service safety time (which information is stored in memory unit 16) for the gas consuming apparatus, the criterion circuit 20 generates the closed signal or shutoff signal which is applied to the valve 4, closing the valve 4.

The present invention thereby overcomes the disadvantages of past devices by recognizing which gas consuming apparatus is activated and starting a timer to make sure that the gas consuming apparatus does not stay activated longer than its continuous service safety time. As more than one gas consuming apparatus can be in an activated condition at any one time, the flow rate register 10 of the invention selects the larger consumer gas and tracks this consumer gas volume. In the meantime, it ignores the starting and stopping of other gas consuming apparatuses as long as they are not consuming more gas than the gas consuming apparatus being tracked.

FIG. 2 shows the closed condition of the emergency shutoff valve 4 in this invention as mentioned above, where if the flow rate "Q1" is sensed by unit 3, a timer in unit 5 for counting the continuous service safety time for this flow rate is started for beginning the measurement. And, if there is any increase in flow rate ("Q") after the lapse of T1 time, another time for counting the continuous service time for "Q2" is started, while the time for counting the continuous service time for "Q2" after the lapse of T2 time, the gas apparatus with Q2 flowrate is stopped in service and the timer for counting the continuous service time for Q2 is cleared regarding the flow rate Q1 as being continued, whereas the timer for counting the continuous service time for Q1 continues to measure the time without being cleared. A close signal is generated by unit 5 for closing the emergency shutoff valve 4 when the continuous service safety time Tn for Q1 is surpassed. For information, if there is a flow rate of Q2 when the Q1 is stopped in service in a normal way, the time counting will be continued for this Q2.

The aforesaid shows the simplest example, and the supply of gas will be stopped to the gas apparatus being measured at the same time if any of them should have exceeded the continuous service safety time for the first time. Moreover, respective gas apparatuses should basically be measured in the continuous service safety time individually, but some gas apparatus has a smaller gas consumption and does not lead to an explosion or a danger in life maintenance since a raw gas is diffused to the atmosphere even though it is jetted out as it is. Besides, if the gas apparatus with the largest gas consumption should be monitored in the event that several sets of gas apparatus are being used, such a case is also conceivable that there is no need for simultaneously monitoring other gas apparatuses from the viewpoint of safety.

If the situation, as mentioned above, is imagined with the gas apparatuses, the control circuit of the following structure can be adopted. Namely, the control circuit shall be structured in a way capable of memorizing in advance the continuous service safety time of each single gas apparatus according to the gas consumed volume. The circuit shall also be capable of measuring the gas consumption volume of respective apparatuses currently in use. An increase in the consumed volume of gas in the entire system, recognizable by an increase in the volume of gas measured from one time to the next, is regarded as a set of gas apparatus being newly used. Likely, an assumption is made that the gas apparatus, closest in consumed volume to the decrease in the entire system, has stopped being used. The control circuit is also capable of understanding an abnormality and emitting the close signal to the emergency shutoff valve 4 when the measurement time has exceeded the continuous service safety time of the aforesaid gas apparatus. This is done by starting the measurement of continuous service safety time since detecting, by the aforesaid method, that the gas apparatus having a larger gas consumption volume than any other apparatuses being currently used has newly been put into service, and by continuing the measurement of continuous service safety time so long as the service of this equipment is recognized. The aforementioned operation principle is to be expounded on the basis of FIG. 2

When the flow rate "Q1" being used by the gas apparatus with larger gas consumption volume than any of apparatuses currently in use is sensed, the timer begins to measure the time. And the counting will be continued because of the relation being Q2<Q1 even if there is an increase in flow rate of "Q2" after the lapse of T1 time. Moreover, if there is any decrease in flow rate "Q2" after the lapse of T2 time, the gas apparatus with Q2 flowrate will be stopped in service, and the time measurement will be continued by regarding that the flow rate called "Q1" is being continued. And the close signal is sent out to the emergency shutoff valve 4 when the continuous service safety time Tn for Q1 has been exceeded. In addition, if there is the flow rate of Q2 when the Q1 has been stopped normally in service, the measurement will be started for this Q2.

As a further example, reference is made to FIG. 2B. In FIG. 2B, the gas flow rate Q is plotted against time T. In this figure, it can be seen how the device of the present invention recognizes that the gas consumption of the apparatus having flow rate Q1 has been started by measuring the total flow equal to Q1 at time T1. Between time T2 and T3, the gas consumption of an apparatus with flow rate Q2 has been started as seen by the fact that the total flow rate Q is equal to Q1 plus Q2 at time T2. Between time T3 and T4, it can be seen that the gas consumption of a device having a flow rate Q3 has been started. This is evident from the fact that the total flow rate includes flow components Q1 plus Q2 plus Q3 at the time T3.

At time T4, the gas consumption of the device having a flow rate of Q2 has been stopped. This can be seen by the fact that the total flow Q is equal to Q1 plus Q3 at time T4. At time T5, the consumption of the device having a flow rate Q3 has been stopped as can be seen by the fact that the total flow Q is equal to Q1 at time T5. At time T6, gas consumption of the device having flow rate Q1 has been stopped. This can be seen by the fact that at time T6 the total flow rate Q is equal to 0.

In this way, the device of the present invention can recognize that the gas consumption Q1 has been continued from time T1 to T6. Additionally, it can be seen that the gas consumption Q2 has been continued from time T2 to time T4. The gas consumption Q3 has been continued from time T3 to T5. As described above, according to the invention, the use conditions of each gas consuming apparatus may be monitored. Additionally, the flow of all gas may be shut off when the using time exceeds the safety time which has been previously set.

As explained above, the unit in this invention serves to memorize in advance the continuous service safety time according to the gas consumed volume of gas apparatus that is installed by a gas user. The unit can measure the whole of the gas flow rate value being supplied to the gas user at every certain interval of time, and can obtain the gas consumed volume along with the service start and stop time of individual apparatuses being in use by regarding the increased portion as the consumed volume of a single set of gas apparatus being newly used in the event that any increase is recognized between the previously measured value and the measured value this time and by regarding that the use of gas apparatus closest in consumption volume to the decreased portion is stopped in the event any decrease is recognized. This serves to measure the continuous service safety time of individual gas apparatuses under service and to stop the flow of gas, namely the supply of gas when any of gas apparatuses should have exceeded the corresponding continuous service safety time.

As a result, even while using the gas apparatus repeating the ON/OFF operation automatically, the monitor of continuous service safety time for all the gas apparatuses in use cannot be interfered by this automatic ON/OFF operation.

Figure 4:
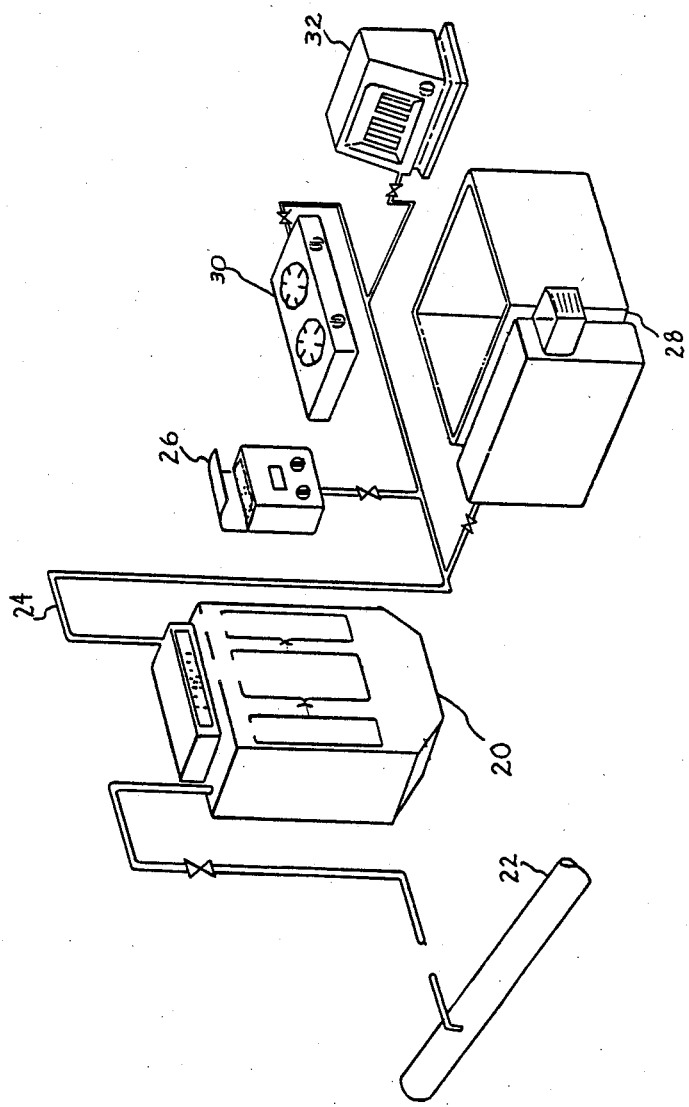
FIG. 4 is a schematic of an arrangement of gas consuming apparatus with a gas accident preventive unit according to the invention positioned so as to shut off the flow of gas in an emergency.

Moreover, if the continuous service safety time is monitored only with the gas apparatus with the largest consumption volume out of the gas apparatuses now under use, there are merits of eliminating the need for useless monitor as to the gas apparatus with a small amount of gas consumption volume which is in the order free from any problem in reality, and capable of designing the control unit to a smaller capacity. As seen in FIG. 4, the device of the present invention is used with several appliances monitoring the entire flow rate to all of the appliances. The gas meter generally designated 20 is connected to the gas supply pipe 22 in a normal fashion. The gas meter shown in FIG. 1 monitors the flow as discussed above. A gas connection 24 carries gas from the gas meter to the various appliances. These appliances may include a small boiler 26, a bathtub water heater 28, a gas range 30 and a gas heater 32. As discussed above, the gas meter monitors the entire flow going to all of these units. The flow through gas line 24 may be shut off by the gas meter when the continuous service safety time for an individual gas consuming apparatus has been exceeded.

While a specific embodiment of the invention has been shown and described in detail to illustrate the application of the principles of the invention, it will be understood that the invention may be embodied otherwise without departing from such principles.

What is claimed is:

1. A gas accident preventive unit for use with a plurality of gas consuming apparatuses, each gas consuming apparatus having a continuous service safety time and having a gas consumption volume per unit time which is used by that gas consuming apparatus, comprising;

a flow rate measuring unit for measuring the total flow rate per unit time of all gas consumed by all gas consuming apparatuses which are activated for consuming their respective gas consumption volumes;

an emergency shutoff valve for shutting off the flow of all gas being supplied to all gas consuming apparatuses and being responsive to a closed signal for closing the flow of gas; and a control circuit means connected to said flow rate measuring unit for continuously receiving a flow rate value corresponding to the flow of all gas to all activated gas consuming apparatuses, for generating said closed signal and being connected to said emergency shutoff valve for applying said control signal to said emergency shutoff valve to close the flow of all gas to all gas consuming apparatuses, said control circuit comprising memory for storing the continuous service safety time for each gas consuming apparatus, flow rate register means for receiving the flow rate value from the flow rate measuring unit and for identifying increases in the flow rate value which correspond to a gas consumption value of a newly activated gas consuming apparatus and for recognizing a decrease in the flow rate value corresponding to the gas consumption value of a newly deactivated gas consuming apparatus, timer means connected to said flow rate register for initiating a timing period upon the sensing by the flow rate register means of a flow rate value corresponding to a gas consumption value of a gas consuming apparatus, said timer means continuing in response to said flow rate register means despite increases and decreases caused by the activation and deactivation of other gas consuming apparatuses, and criterion circuit means connected to said timer for generating said closed signal when said timer has indicated a time greater than the continuous service safety time for the gas consuming apparatus which is sensed to be activated by said flowrate register for closing said emergency shutoff valve.

* * * * *